US011991526B2

(12) United States Patent
Purkayastha et al.

(10) Patent No.: US 11,991,526 B2
(45) Date of Patent: May 21, 2024

(54) SIDELINK PAIRED AND UNPAIRED STATES

(71) Applicant: QUALCOMM Incorporated, San Diego, CA (US)

(72) Inventors: Punyaslok Purkayastha, San Diego, CA (US); Karthika Paladugu, San Diego, CA (US); Gavin Bernard Horn, La Jolla, CA (US); Rajat Prakash, San Diego, CA (US); Hong Cheng, Basking Ridge, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 17/118,473

(22) Filed: Dec. 10, 2020

(65) Prior Publication Data
US 2021/0185521 A1    Jun. 17, 2021

Related U.S. Application Data

(60) Provisional application No. 62/948,740, filed on Dec. 16, 2019.

(51) Int. Cl.
*H04W 12/50* (2021.01)
*H04W 4/06* (2009.01)
*H04W 76/14* (2018.01)
*H04W 76/19* (2018.01)
*H04W 76/38* (2018.01)

(52) U.S. Cl.
CPC ............. *H04W 12/50* (2021.01); *H04W 4/06* (2013.01); *H04W 76/14* (2018.02); *H04W 76/19* (2018.02); *H04W 76/38* (2018.02)

(58) Field of Classification Search
None
See application file for complete search history.

(56) References Cited

U.S. PATENT DOCUMENTS

| 2017/0244715 | A1* | 8/2017 | Menon ............... H04W 12/082 |
| 2019/0223008 | A1 | 7/2019 | Vanderveen et al. |
| 2021/0195395 | A1* | 6/2021 | Pola ....................... H04W 76/38 |

FOREIGN PATENT DOCUMENTS

| CN | 102057698 A | 5/2011 |
| EP | 3402300 A1 | 11/2018 |
| WO | 2019/158708 A1 | 8/2019 |

(Continued)

OTHER PUBLICATIONS

International Search Report & Written Opinion dated Mar. 22, 2021 from corresponding PCT Application No. PCT/US2020/064639.

(Continued)

*Primary Examiner* — Mazda Sabouri
(74) *Attorney, Agent, or Firm* — Arent Fox, LLP

(57) ABSTRACT

A user equipment (UE) establishes a unicast link with a second UE, including establishing an authentication and security establishment procedure between the first UE and the second UE. The UE establishes a security context with the second UE during the authentication and security establishment procedure. The UE starts a timer based on a status of the unicast link. The UE reestablishes the unicast link with the second UE using the security context when the unicast link is reestablished prior to expiration of the timer.

10 Claims, 13 Drawing Sheets

(56) References Cited

FOREIGN PATENT DOCUMENTS

WO      2019186303  A1   10/2019

OTHER PUBLICATIONS

Qualcomm Incorporated: Updates to network authorised one-to-one conmunication, 3GPP Draft; S2-132457-Network-Authorised-Update-RI, 3rd Generation Partnership Project (3GPP), Mobile Competence Centre . 650, Route Des L.ucioles, F-06921 Sophia-Antipolis Cedex • France; vol. SA WG2, No. Valencia, Spain; Jul. 15, 2013-Jul. 19, 2013 Jul. 9, 2013 (Jul. 9, 2013), XP050725851, Retrieved from the Internet: URL:http://www.3gpp.org/ftp/tsg_sa/WG2_Arch/TSGS2_98_Valencia/Docs/—[retrieved-on Jul. 9, 2013] p. 1-p. 5, figures 62.4.2.1-1.

Qualcomm et al: "PC5-RRC and PC5-S interactions and their security in NR V2X", 3GPP Draft; R2-1916149, 3rd Generation Partnership Project (3GPP), Mobile Competence Centre; 650, Route Des Lucioles; F-06921 Sophia-Antipolis Cedex; France; vol. RAN WG2, No. Reno, USA; Nov. 18, 2019-Nov. 22, 2019 Nov. 8, 2019 (Nov. 8, 2019), XP051817693, Retrieved from the Internet: URL:https://ftp.3gpp.org/tsg_ran/WG2_RL2/TSGR2_108/Docs/R2-1916149.zip-R2-1916149 NR V2X security.docx.docx [retrieved on Nov. 8, 2019] the whole document.

* cited by examiner

SIDELINK PAIRED AND UNPAIRED STATES

CROSS REFERENCE TO RELATED APPLICATION(S)

This application claims the benefit of U.S. Provisional Application Ser. No. 62/948,740, entitled "SIDELINK PAIRED AND UNPAIRED STATES" and filed on Dec. 16, 2019, which is expressly incorporated by reference herein in its entirety.

BACKGROUND

Technical Field

The present disclosure relates generally to communication systems, and more particularly, to a wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

User Equipments (UEs) may communicate directly with each other through device to device communication links (e.g., sidelink communication). Establishing the device to device communication links may include an authentication and security establishment procedure, which may cause latency for communication between the UEs.

A UE establishes a unicast link with a second UE, including establishing an authentication and security establishment procedure between the first UE and the second UE. The UE establishes a security context with the second UE during the authentication and security establishment procedure. The UE starts a timer based on a status of the unicast link. The UE reestablishes the unicast link with the second UE using the security context when the unicast link is reestablished prior to expiration of the timer.

In an aspect of the disclosure, a method, a computer-readable medium, and an apparatus are provided. The apparatus establishes a unicast link with a second UE, establishing the unicast link comprising an authentication and security establishment procedure between the first UE and the second UE, establishes a security context with the second UE during the authentication and security establishment procedure, starts a timer based on a status of the unicast link, reestablishes the unicast link with the second UE using the security context when the unicast link is reestablished prior to expiration of the timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
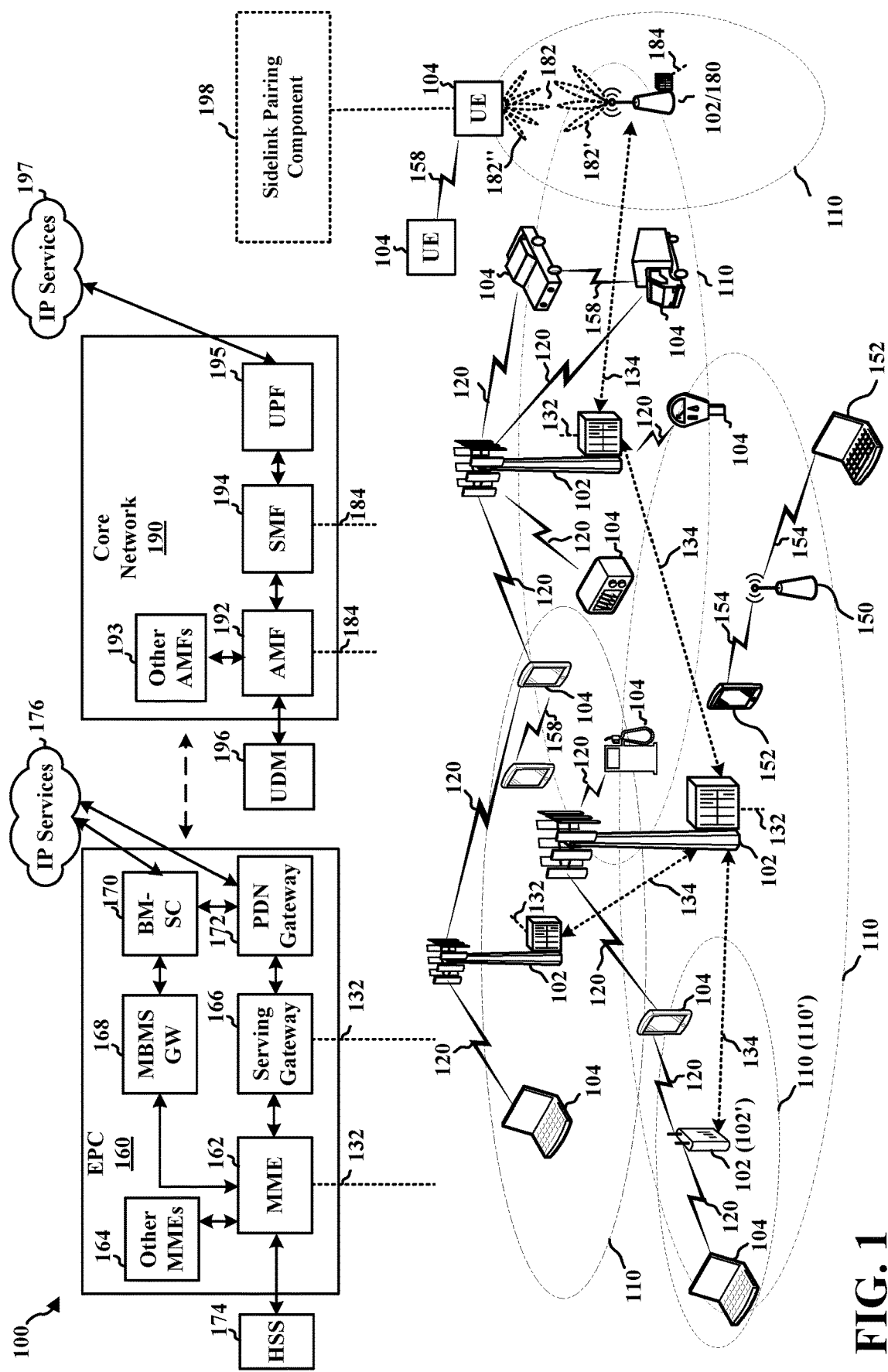
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

User Equipments (UEs) may communicate directly with each other through device to device communication links (e.g., sidelink communication). Establishing the device to device communication links may include an authentication and security establishment procedure, which may cause latency for communication between the UEs.

Aspects presented herein provide for the use of a sidelink paired state and a sidelink unpaired state that may help to reduce latency for communication between two UEs by using keys previously established in an authentication and security establishment procedure to reestablish a unicast link between two UEs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some sidelink communication may include vehicle-based communication devices that may include vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to-everything (C-V2X) and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may include a sidelink pairing component 198. The sidelink pairing component 198 may be configured to retain security context between the UE 104 and another UE for sidelink communications. Although the following description may be focused on 5G NR sidelink and the PC5-S security context, the concepts described herein may be applicable to other similar areas and other wireless technologies.

Figure 2:
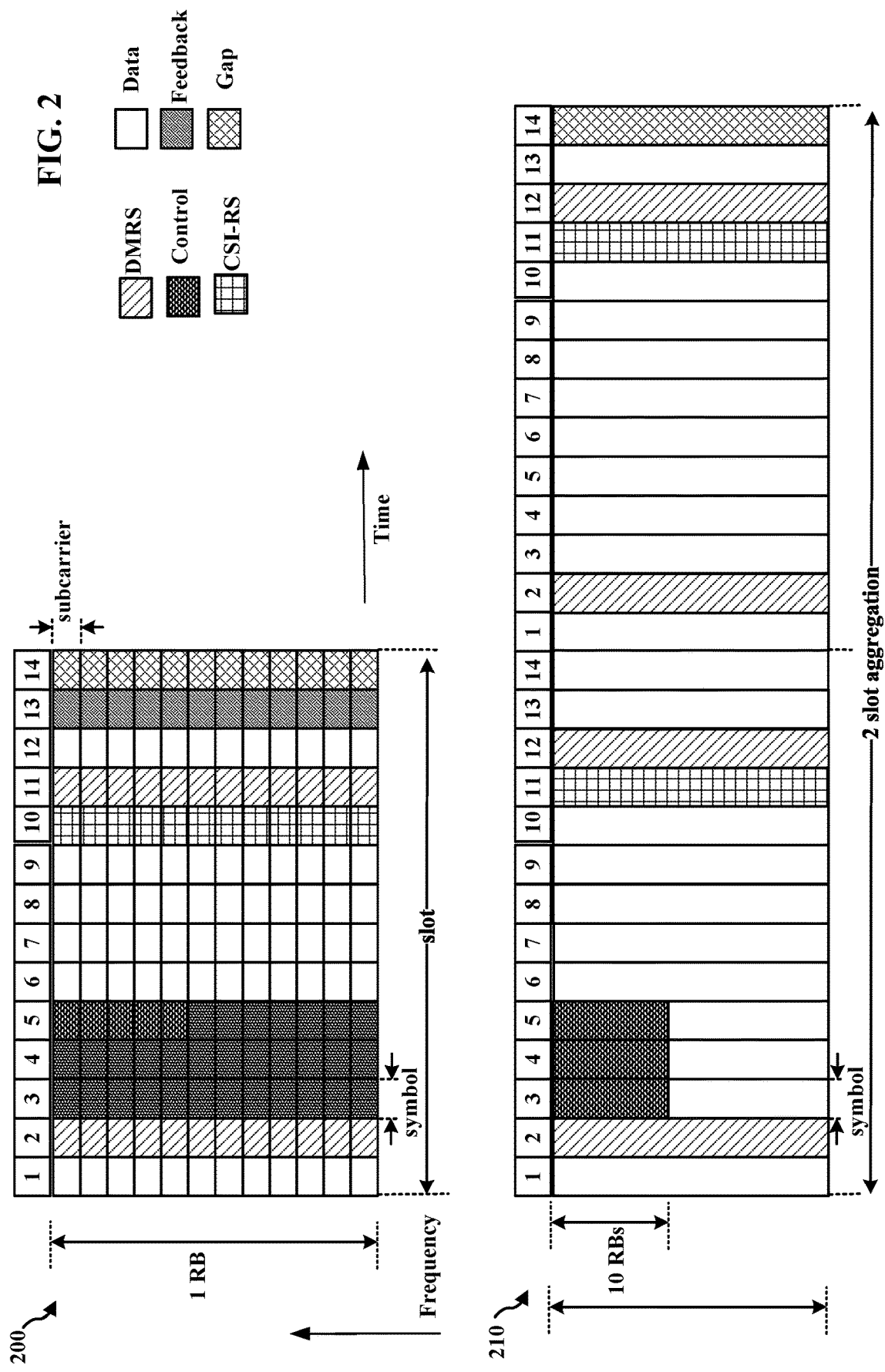
FIG. 2 illustrates example slot structures that may be used for wireless communication between two UEs.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and listen before talk symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
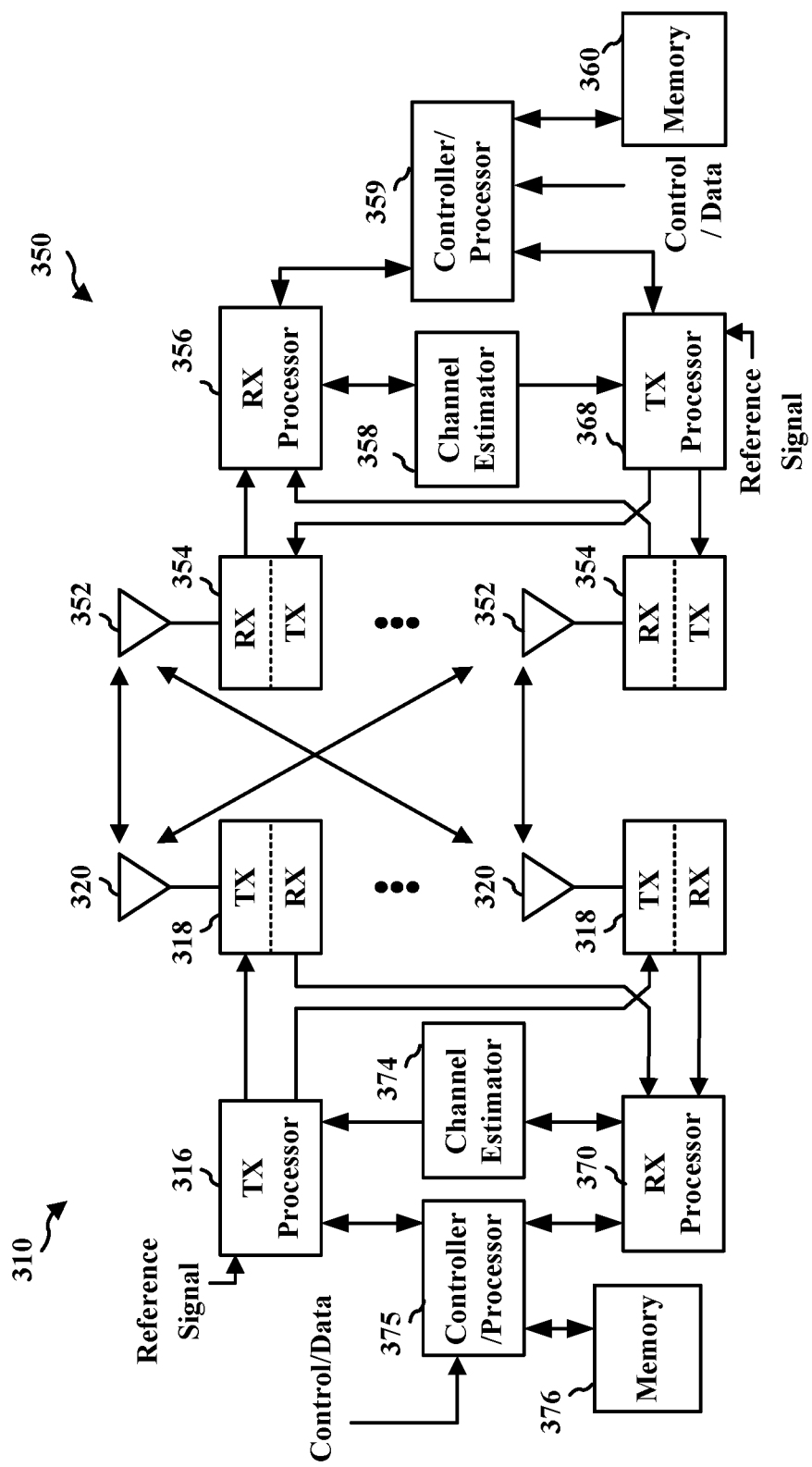
FIG. 3 is a diagram illustrating an example of a base station and user equipment (UE) in an access network.

FIG. 3 is a block diagram 300 of a first wireless communication device 310 in communication with a second wireless communication device 350, e.g., based on sidelink. As an example, sidelink based communication may include V2V, V2X, ProSe, or other D2D communication. The device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 of FIG. 1.

Figure 4:
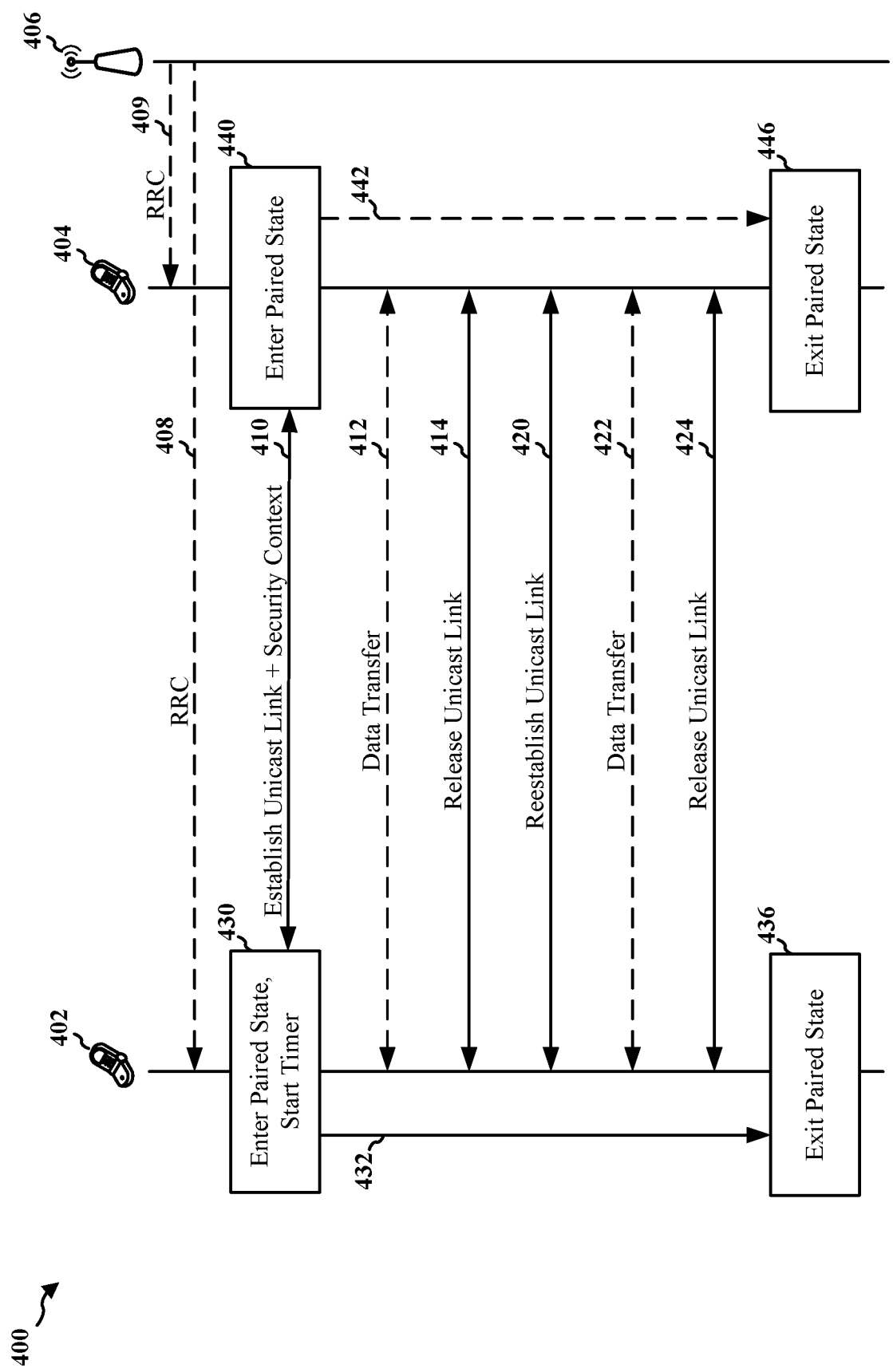
FIG. 4 is a communication diagram illustrating a first UE and a second UE utilizing a sidelink paired state.

FIG. 4 is a communication diagram 400 illustrating a first UE 402 and a second UE 404 utilizing a sidelink paired state. UEs may establish D2D communication links, such as unicast links, with other UEs to facilitate D2D communication. The UEs may maintain a sidelink paired or a sidelink unpaired state associated with a given communication link, and may retain security context associated with communication links in the paired state.

As illustrated at 410, the first UE 402 and the second UE 404 may establish a unicast link between the first UE 402 and the second UE 404. As part of or during establishing the unicast link, the first UE 402 and the second UE 404 may establish a security context for the unicast link. The security context may be a PC5 signaling protocol (PC5-S) security context. In some aspects, the security context includes security keys, such as PC5-S security keys and security procedure, which are used for control signaling over the unicast link and for data transfer over sidelink DRBs established on the unicast link. In some aspects, the security procedure may be a security algorithm. In some aspects, the first UE 402 and the second UE 404 may establish the unicast link and security context as illustrated in FIG. 5.

Figure 5:
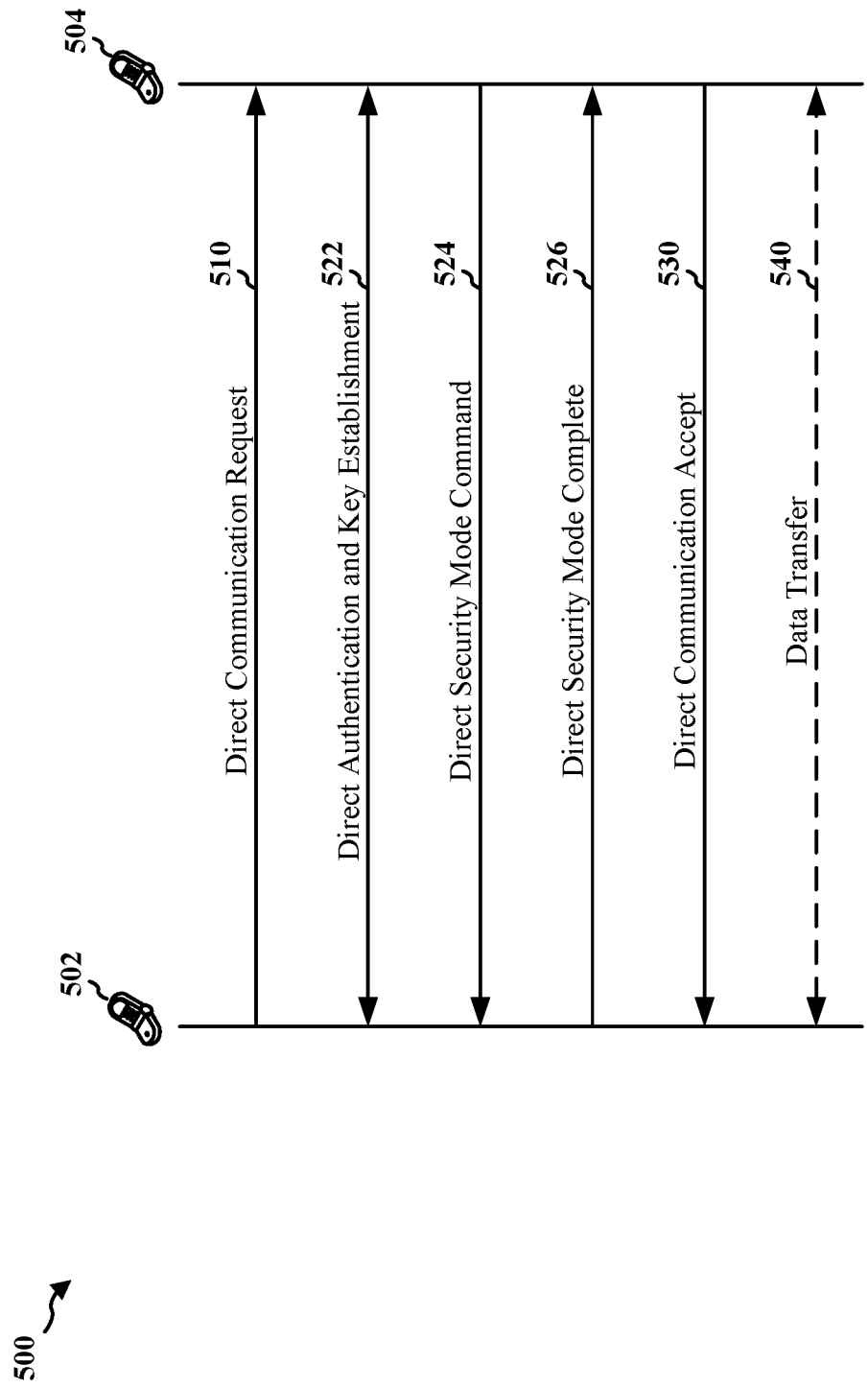
FIG. 5 is a communication diagram illustrating establishing a unicast link and a security context between a first UE and a second UE.

FIG. 5 is a communication diagram 500 illustrating establishing a unicast link and a security context between a first UE 502 and a second UE 504. The first UE 502 may initiate establishing the unicast link by transmitting a direct communication request 510 to the second UE 504, and the second UE 504 may receive the direct communication request 510. The first UE 502 and the second UE 504 may then perform direct authentication and key establishment 522. During the direct authentication and key establishment 522, the first UE 502 and the second UE 504 may generate the security context, such as security keys, for the unicast link. The second UE 504 may transmit a direct security mode command message 524 to the first UE 502, and the first UE 502 may receive the direct security mode command message 524. The first UE 502 may transmit a direct security mode complete message 526 to the second UE 504, and the second UE 504 may receive the direct security mode complete message 526. The direct authentication and key establishment 522, the direct security mode command message 524, and the direct security mode complete message 526 may constitute authentication and security establishment for the unicast link. Finally, the second UE 504 may transmit a direct communication accept 530 to the first UE 502, and the first UE 502 may receive the direct communication accept 530, completing the establishment of the unicast link. The first UE 502 and the second UE 504 may transfer data 540 on the unicast link.

In some aspects, the first UE 502 and the second UE 504 retain the security context for the unicast link after the unicast link is released or after a radio link failure. In some aspects, the direct communication request 510 may include a flag to indicate whether or not the security context should be retained after the unicast link is released, and the first UE 502 and the second UE 504 may retain the security context for the link according to the flag in the direct communication request 510.

In some aspects, the direct communication request 510 may include an indicator (e.g., a flag) to indicate that the security context generated during the authentication and security establishment for the unicast link should be retained after the unicast link has been released. The direct communication accept 530 may also include an indicator (e.g., a flag) to indicate whether the second UE 504 will retain the security context or is capable of retaining the security context. For example, the second UE 504 may determine if it has adequate memory available to retain the security context, and may set the indicator in the direct communication accept 530 accordingly.

Referring again to FIG. 4, upon establishing the link and security context, the first UE 402 may enter the paired state with respect to the unicast link 410 as illustrated at 430, and the second UE 404 may enter the paired state with respect to the unicast link 410 as illustrated at 440. The first UE 402 and the second UE 404 may perform a data transfer 412 on the unicast link, and the data transfer 412 may be made pursuant to the security context.

The first UE 402 may utilize a timer 432 to determine how long to remain in the paired state. In some aspects, the first UE 402 may start the timer 432 upon entering the paired state as illustrated at 430. The timer 432 may have a set amount of time before it expires (e.g., a duration of the timer). The set amount of time may be configured or preconfigured for the first UE 402. In some aspects, a base station 406 may transmit an RRC message 408 to the first UE 402, and the RRC message 408 may include an amount of time for the timer 432 (e.g., a timer duration). The first UE 402 may receive the RRC message 408 and may configure the timer 432 to expire based on the time identified in the RRC message 408. While the timer 432 has not expired, the first UE 402 remains in the paired state and retains the security context associated with the unicast link.

In some aspects, the first UE 402 may, upon receiving the RRC message 408 and configuring the timer 432 based on the time identified in the RRC message 408, configure a timer 442 of the second UE 404. For example, the first UE 402 may transmit a message (e.g., a sidelink RRC message) to the second UE 404 including the amount of time, and the second UE 404 may configure the timer 442 based on the message.

In some aspects, the second UE 404 may utilize a timer 442 to determine how long to remain in the paired state. In some aspects, the second UE 404 may start the timer 442 upon entering the paired state as illustrated at 440. The timer 442 may have a set amount of time before it expires. The set amount of time may be configured or preconfigured for the second UE 404. In some aspects, the base station 406 may transmit an RRC message 409 to the second UE 404, and the RRC message 409 may include an amount of time for the timer 442. The second UE 404 may receive the RRC message 409 and may configure the timer 442 to expire based on the time identified in the RRC message 409. While the timer 442 has not expired, the second UE 404 remains in the paired state and retains the security context associated with the unicast link.

In some aspects, the second UE 404 may, upon receiving the RRC message 409 and configuring the timer 442 based on the time identified in the RRC message 409, configure the timer 432 of the first UE 402. For example, the second UE 404 may transmit a message (e.g., a sidelink RRC message) to the first UE 402 including the amount of time, and the first UE 402 may configure the timer 432 based on the message.

In some aspects, the timer of one UE may be configured by the base station 406 and that UE may configure the other UE. For example, the first UE 402 may receive the RRC message 408 with the amount of time for the timer 432 and may reconfigure the timer 432 based on the received amount of time. The first UE 402 may transmit a message, such as a PC5-RRC (AS) reconfiguration message, to the second UE 404 including the received amount of time and the second UE 404 may reconfigure the timer 442 based on the received amount of time.

In some aspects, if one or both of the first UE 402 and the second UE 404 are within range of the base station 406, the base station 406 may configure the timers of the UEs (directly or through the peer UE), and if both of the first UE 402 and the second UE 404 are out of range of the base station 406, the first UE 402 and the second UE 404 may use a preconfigured value, such as a value in a universal integrated circuit card (UICC), for the timers.

As illustrated at 414, the first UE 402 and the second UE 404 may release the unicast link. In some aspects, the data transfer 412 on the unicast link may have completed so the first UE 402 and the second UE 404 may have released the unicast link. In some aspects, the first UE 402 and the second UE 404 may have released the unicast link based on the first UE 402 and/or the second UE 404 detecting a radio link failure. As the first UE 402 and the second UE 404 are in the paired state, they may retain the security context created during establishing the unicast link at 410.

In some aspects, the second UE 404 may transmit a unicast release message to the first UE 402 to cause the first UE 402 and the second UE 404 to release the unicast link. The unicast release message may include an indicator (e.g., a flag) to indicate whether the second UE 404 will retain the security context or is capable of retaining the security context. For example, the second UE 404 may determine if it has adequate memory available to retain the security context, and may set the indicator in the unicast release message accordingly.

As illustrated at 420, after the first UE 402 and the second UE 404 have released the unicast link 414, but while the first UE 402 and the second UE 404 are still in the paired state (e.g., before the timer 432 and the timer 442 have expired), the first UE 402 and the second UE 404 may reestablish the unicast link. Either the first UE 402 or the second UE 404 may determine to reestablish the unicast link, and may transmit a message to the other UE to initiate reestablishing the unicast link. As the first UE 402 and the second UE 404 are still in the paired state, they may utilize the security context established at 410 for reestablishing the unicast link at 420. In some aspects, the first UE 402 and the second UE 404 may reestablish the unicast link as illustrated in FIG. 6.

Figure 6:
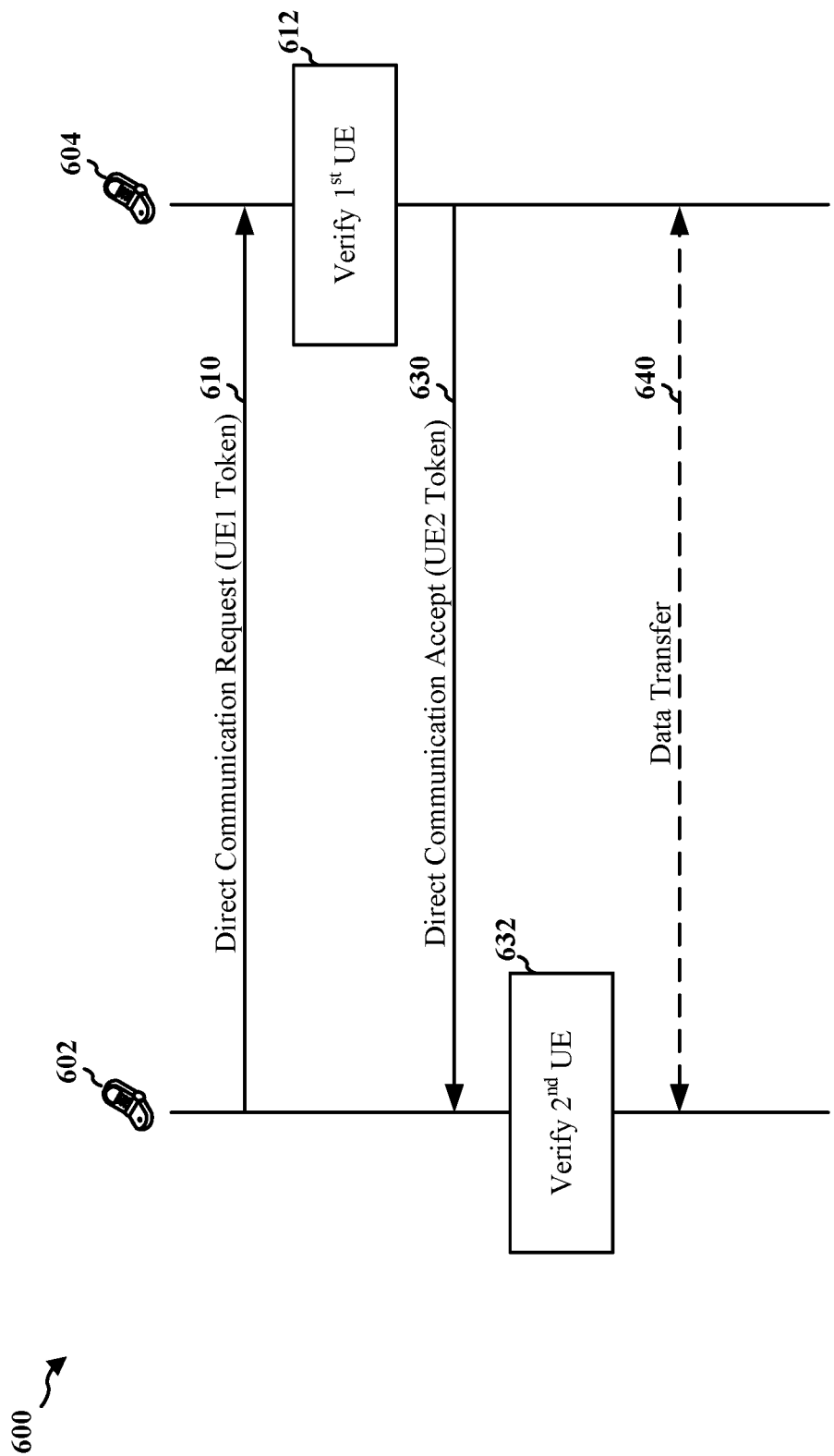
FIG. 6 is a communication diagram illustrating establishing a unicast link between a first UE and a second UE in a sidelink paired state.

FIG. 6 is a communication diagram 600 illustrating establishing a unicast link between a first UE 602 and a second UE 604 in a sidelink paired state. The first UE 602 may transmit a direct communication request 610 to the second UE 604. The direct communication request 610 may include a security token for the first UE 602 (e.g., a shortMAC-UE), and may also include an identifier for the first UE 602. The security token may be based on the security context for the unicast link. For example, the token may be created using keys that are part of the security context, UE IDs (e.g., UE Layer-1 ID), and/or a unicast link identifier. The second UE 604 may receive the direct communication request 610 and, as illustrated at 612, verify the identity of the first UE 602 based on the security token and the identifier included in the direct communication request 610.

Upon verifying the first UE 602, the second UE 604 may transmit a direct communication accept 630 to the first UE 602. The direct communication accept 630 may include a security token for the second UE 604 (e.g., a shortMAC-I IE), and may also include an identifier for the second UE 604. This security token may also be based on the security context for the unicast link, such as keys that are part of the security context, UE IDs (e.g., UE Layer-1 ID), and/or a unicast link identifier. The first UE 602 may receive the direct communication accept 630 and, as illustrated at 632, may verify the identity of the second UE 604 based on the security token and the identifier included in the direct communication accept 630.

Upon verification of the second UE 604 by the first UE 602, the unicast link may be reestablished and the first UE 602 and the second UE 604 may perform a data transfer 640 on the unicast link. The first UE 602 and the second UE 604 may reestablish the unicast link without performing the authentication and security establishment described with respect to the initial establishment of the unicast link at 410, including the direct authentication and key establishment 522, the direct security mode command message 524, and the direct security mode complete message 526 may be for the unicast link.

Figure 7A:
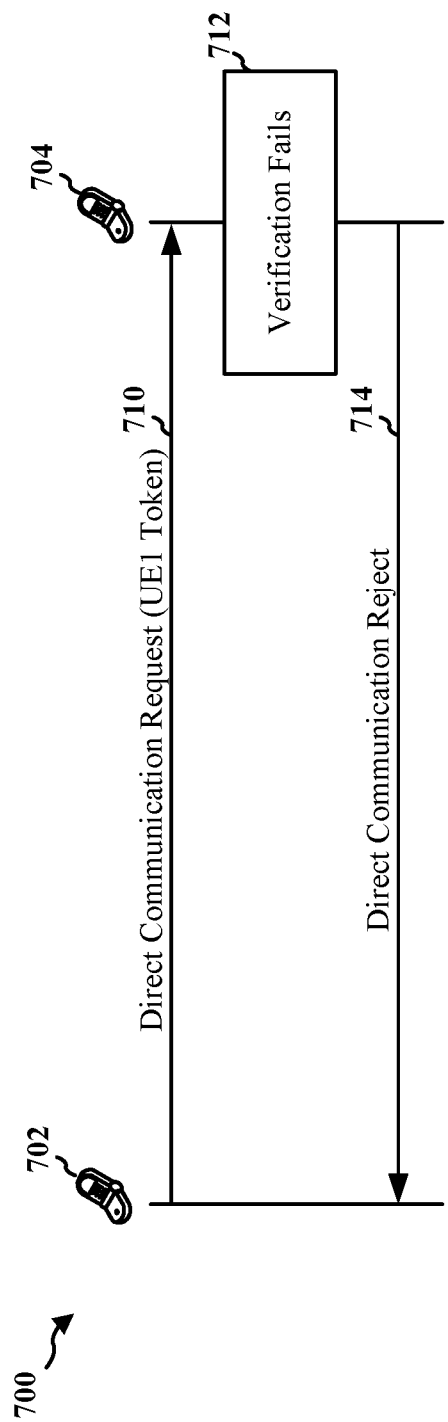
FIG. 7A is a communication diagram illustrating a failed verification of a first UE in a sidelink paired state.

FIG. 7A is a communication diagram 700 illustrating a failed verification of a first UE 702 in a sidelink paired state. The first UE 702 may attempt to reestablish a unicast link with a second UE 704 by transmitting a direct communication request 710, including a security token and an identifier for the first UE 702, to the second UE 704. The second UE 704 may receive the direct communication request 710 from the first UE 702, but may not be able to verify the identity of the first UE 702 based on the security token and the identifier received in the direct communication request 710. Accordingly, as illustrated at 712, verification of the first UE 702 may fail. The second UE 704 may transmit a direct communication reject 714 to the first UE 702, and may release the security context for the unicast link, enter the unpaired state with respect to the unicast link, and/or stop the timer associated with the unicast link. Upon receiving the direct communication reject 714, the first UE 702 also may release the security context for the unicast link, enter the unpaired state with respect to the unicast link, and/or stop the timer associated with the unicast link.

Figure 7B:
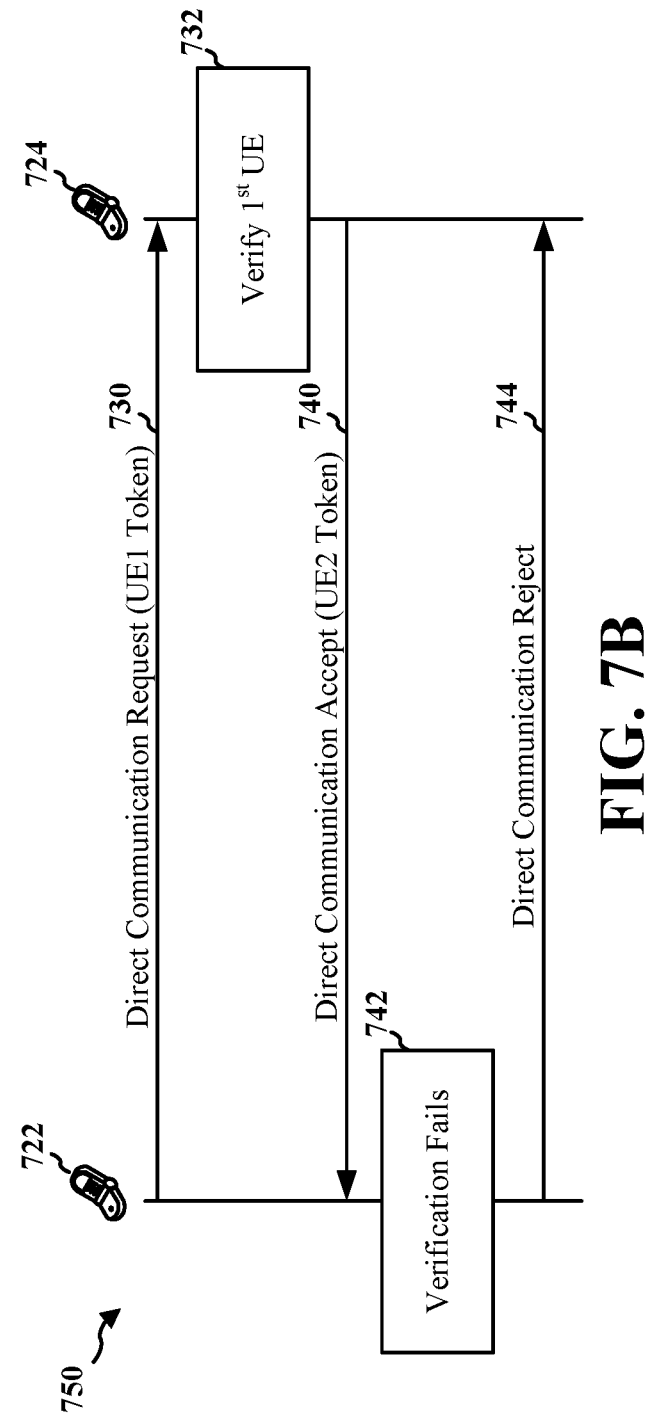
FIG. 7B is a communication diagram illustrating a failed verification of a second UE in a sidelink paired state.

FIG. 7B is a communication diagram 750 illustrating a failed verification of a second UE 724 in a sidelink paired state. The first UE 722 may attempt to reestablish a unicast link with a second UE 724 by transmitting a direct communication request 730, including a security token and an identifier for the first UE 722, to the second UE 724. The second UE 704 may receive the direct communication request 730 from the first UE 722 and, as illustrated at 732, may verify the identity of the first UE 722 based on the security token and the identifier in the direct communication request 730. The second UE 724 may transmit a direct communication accept 740, including a security token and an identifier for the second UE 724, to the first UE 722. The first UE 722 may receive the direct communication accept 740, but may not be able to verify the identity of the second UE 724 based on the security token and the identifier received in the direct communication accept 740. Accordingly, as illustrated at 742, verification of the second UE 724 may fail. The first UE 722 may transmit a direct communication reject 744 to the second UE 724, and may release the security context for the unicast link, enter the unpaired state with respect to the unicast link, and/or stop the timer associated with the unicast link. Upon receiving the direct communication reject 744, the second UE 724 also may release the security context for the unicast link, enter the unpaired state with respect to the unicast link, and/or stop the timer associated with the unicast link.

Referring again to FIG. 4, if the first UE 402 and the second UE 404 are able to reestablish the unicast link utilizing the stored security context as illustrated at 420, the first UE 402 and the second UE 404 may perform a data transfer 422 on the unicast link pursuant to the security context. As illustrated at 424, for example once the data transfer 422 has completed or upon determining a radio link failure, the first UE 402 and the second UE 404 may again release the unicast link 424.

In some aspects, upon expiration of the timer 432, as illustrated at 436, the first UE 402 may exit the paired state with respect to the unicast link. The first UE 402 may release the security context for the unicast link. Upon expiration of the timer 442, as illustrated at 446, the second UE 404 may exit the paired state with respect to the unicast link, and may release the security context for the unicast link.

In some aspects, the timer 432 and/or the timer 442 may expire while a data transfer such as data transfer 422 is still occurring.

In some aspects, if the timer 432 or the timer 442 expires while data transfer 422 is occurring, the first UE 402 and the second UE 404 may not exit the paired state and release the security context for the unicast link upon expiration of the timer(s). The first UE 402 and the second UE 404 may remain in the paired state and may retain the security context for the unicast link while the data transfer 422 is ongoing. Upon completion of the data transfer 422, the first UE 402 and the second UE 404 may enter the unpaired state and release the security context for the unicast link. This aspect may have a limited implementation complexity and may not interrupt ongoing data transfer or control signaling.

In some aspects, if the timer 432 or the timer 442 expires while data transfer 422 is occurring, the first UE 402 and the second UE 404 may pause the data transfer 422. The first UE 402 and the second UE 404 may then initiate an authentication and security establishment for the unicast link, such a PC5-S security establishment procedure. For example, the authentication and security establishment may include the first UE 402 and the second UE 404 performing the direct authentication and key establishment 522, direct security mode command message 524, and direct security mode complete message 526 discussed above. Once the first UE 402 and the second UE 404 have re-established a security context for the unicast link (e.g., established new keys), the first UE 402 and the second UE 404 may resume the data transfer 422 on the unicast link. In some aspects, the first UE 402 and/or the second UE 404 may notify a scheduling base station such as base station 406 that the data transfer 422 has been paused.

Figure 8:
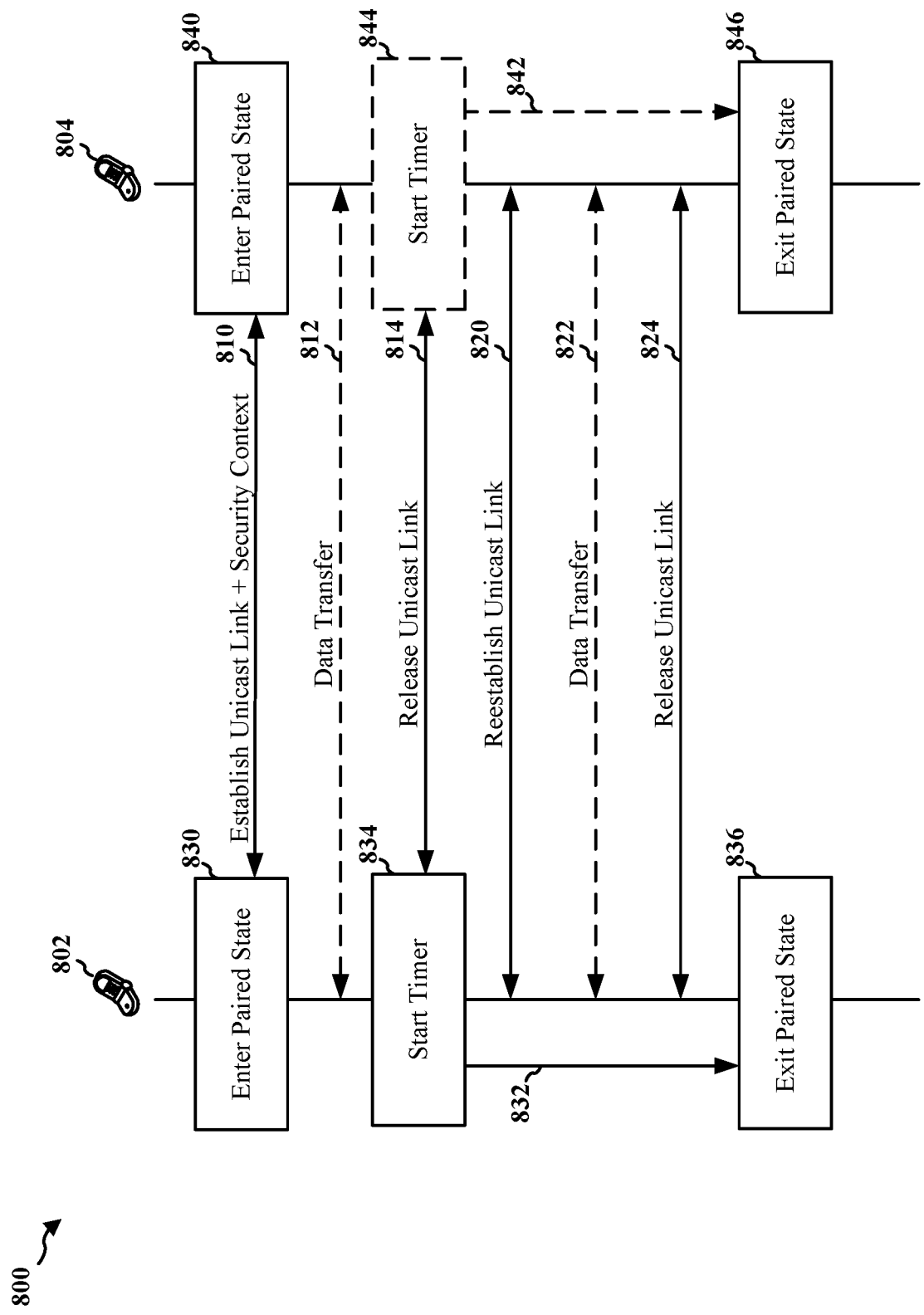
FIG. 8 is a communication diagram illustrating a first UE and a second UE utilizing a sidelink paired state with a timer based on release of the unicast link.

FIG. 8 is a communication diagram 800 illustrating a first UE 802 and a second UE 804 utilizing a sidelink paired state with a timer based on release of the unicast link. The first UE 802 and the second UE 804 may establish a unicast link and security context as illustrated at 810. The first UE 802 and the second UE 804 may enter the paired state as illustrated at 830 and 840, respectively, without starting timers associated with the paired state. The first UE 802 and the second UE 804 may then perform a data transfer 812 on the unicast link pursuant to the established security context.

As illustrated at 814, the first UE 802 and the second UE 804 may release the unicast link 814. Upon releasing the unicast link, as illustrated at 834, the first UE 802 may start a timer 832 associated with the unicast link. While the timer 832 has not expired, the first UE 802 remains in the paired state and retains the security context associated with the unicast link. Similarly, upon releasing the unicast link, as illustrated at 844, the second UE 804 may start a timer 842 associated with the unicast link. While the timer 842 has not expired, the second UE 804 remains in the paired state and retains the security context associated with the unicast link.

While in the paired state, the first UE 802 and the second UE 804 may reestablish the unicast link as illustrated at 820 without reestablishing the security context (e.g., as described with respect to 420 and FIGS. 6, 7A, and 7B), may perform a data transfer 822 on the reestablished unicast link (e.g., as described with respect to 422), and may release the reestablished unicast link as illustrated at 824 (e.g., as described with respect to 424).

Upon expiration of the timer 832, the first UE 802 may exit the paired state as illustrated at 836 and may release the security context for the unicast link. Upon expiration of the timer 844, the second UE 804 may exit the paired state as illustrated at 846 and may release the security context for the unicast link.

Figure 9:
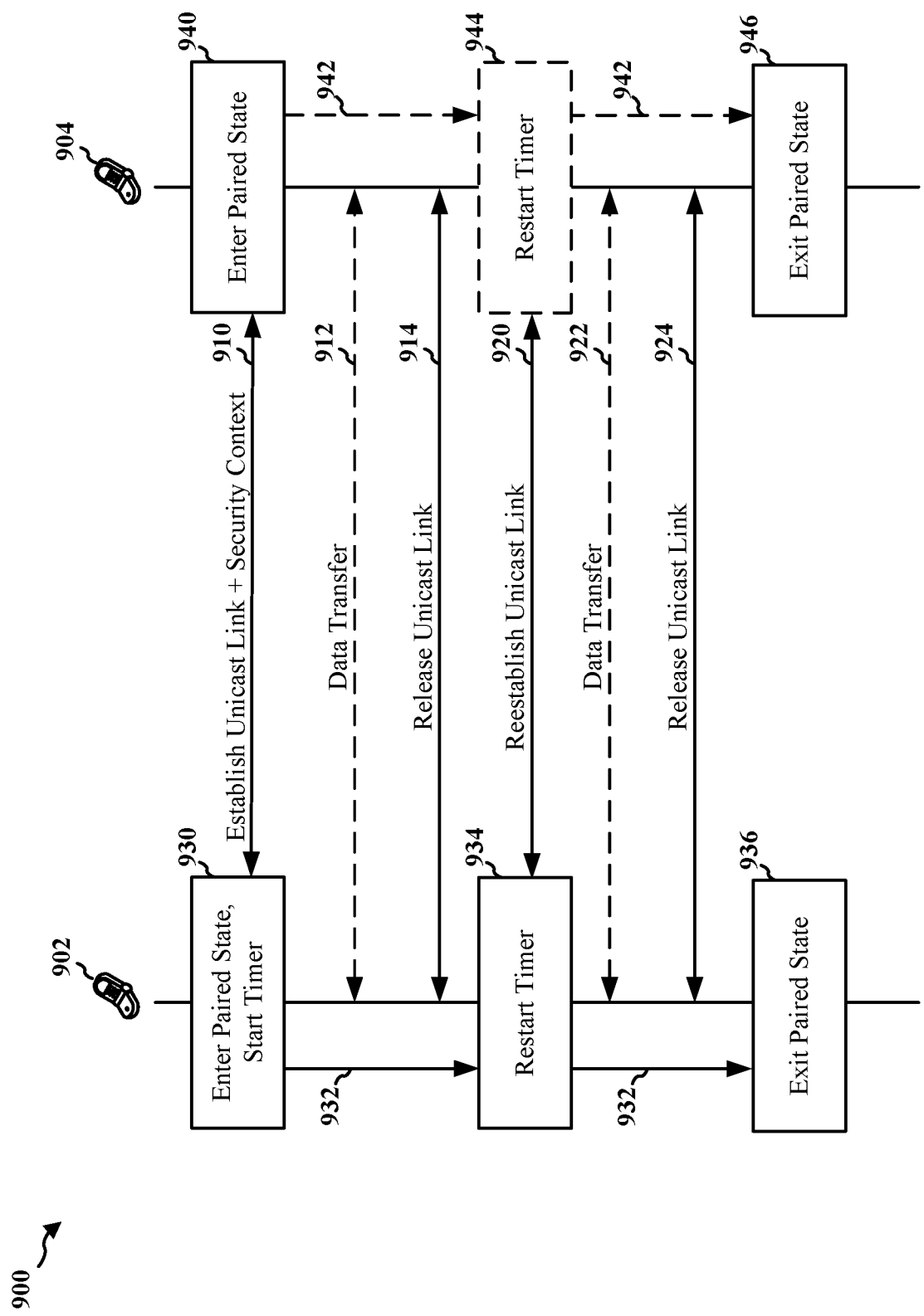
FIG. 9 is a communication diagram illustrating a first UE and a second UE utilizing a sidelink paired state with a timer based on reestablishment of the unicast link.

FIG. 9 is a communication diagram 900 illustrating a first UE 902 and a second UE 904 utilizing a sidelink paired state with a timer based on reestablishment of the unicast link. As illustrated at 910, the first UE 902 and the second UE 904 may establish a unicast link and security context (e.g., as described with respect to 410). As illustrated at 930, the first UE 902 may enter a paired state and start a timer 932 associated with the unicast link (e.g., as described with respect to 430). As illustrated at 940, the second UE 904 may enter a paired state and start a timer 942 associated with the unicast link (e.g., as described with respect to 440). The first UE 902 and the second UE 904 may then perform a data transfer 912 on the unicast link pursuant to the security context and, as illustrated at 914, may release the unicast link, e.g., upon completion of the data transfer 912 or failure of the radio link.

As illustrated at 920, the first UE 902 and the second UE 904 may reestablish the unicast link. This may be done as described with respect to 420 and FIGS. 6, 7A, and 7B. Upon reestablishing the unicast link, the first UE 902 may restart the timer 932 as illustrated at 934 (e.g., may set the duration of the timer to the initial value or to a new value). Upon reestablishing the unicast link, the second UE 904 may restart the timer 942 as illustrated at 944 (e.g., may set the duration of the timer to the initial value or to a new value). Upon successfully reestablishing the unicast link, the first UE 902 and the second UE 904 may therefore extend the duration of the paired state and retention of the security context for the unicast link. The first UE 902 and the second UE 904 may then perform a data transfer 922 on the unicast link pursuant to the security context and, as illustrated at 924, may release the unicast link, e.g., upon completion of the data transfer 922 or failure of the radio link. In some aspects, the first UE 902 and the second UE 904 may also reestablish the unicast link as described with respect to 920 and thereby again restart the duration of the paired state prior to expiration of the timer 932 and/or the timer 942.

The first UE 902 may exit the paired state as illustrated at 936 upon expiration of the timer 932, and the second UE 904 may exit the paired state as illustrated at 946 upon expiration of the timer 942.

Figure 10:
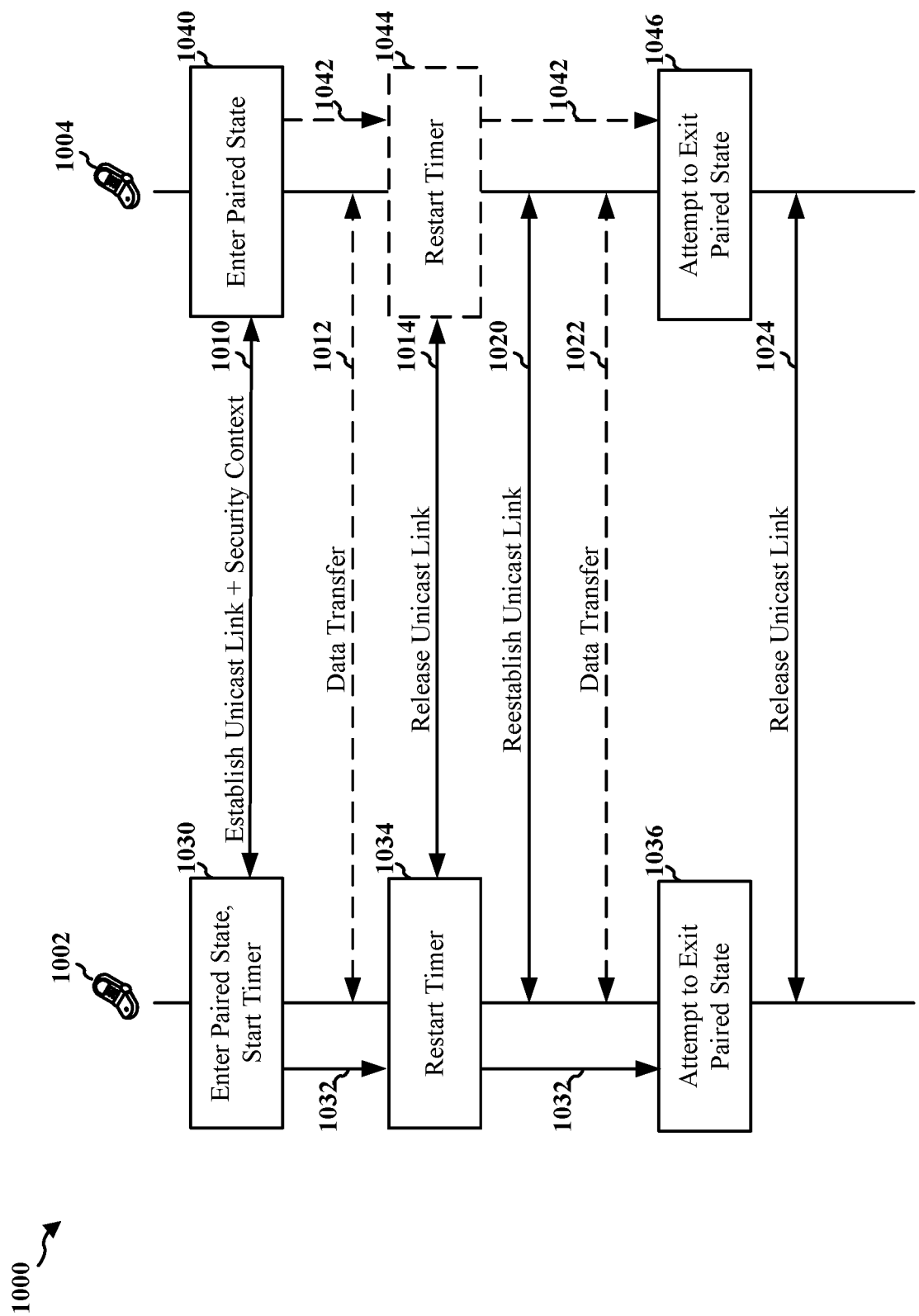
FIG. 10 is a communication diagram illustrating a first UE and a second UE utilizing a sidelink paired state with a timer based on release of the unicast link.

FIG. 10 is a communication diagram 1000 illustrating a first UE 1002 and a second UE 1004 utilizing a sidelink paired state with a timer based on release of the unicast link. As illustrated at 1010, the first UE 1002 and the second UE 1004 may establish a unicast link and security context (e.g., as described with respect to 410). As illustrated at 1030, the first UE 1002 may enter a paired state and start a timer 1032 associated with the unicast link (e.g., as described with respect to 430). As illustrated at 1040, the second UE 1004 may enter a paired state and start a timer 1042 associated with the unicast link (e.g., as described with respect to 440). The first UE 1002 and the second UE 1004 may then perform a data transfer 1012 on the unicast link pursuant to the security context.

As illustrated at 1014, may release the unicast link, e.g., upon completion of the data transfer 1012 or failure of the radio link. Upon releasing the unicast link, the first UE 1002 may restart the timer 1032, as illustrated at 1034 (e.g., may set the duration of the timer to the initial value or to a new value). Upon releasing the unicast link, the second UE 1004 may restart the timer 1042, as illustrated at 1044 (e.g., may set the duration of the timer to the initial value or to a new value). Upon releasing the unicast link, the first UE 1002 and the second UE 904 may therefore extend the duration of the paired state and retention of the security context for the unicast link.

Prior to expiration of the timer 1032 and/or the timer 1042, the first UE 1002 and the second UE 1004 may reestablish the unicast link as illustrated at 1020 (e.g., as described with respect to 420 and FIGS. 6, 7A, and 7B), and may perform a data transfer 1022 on the reestablished unicast link pursuant to the security context. The first UE 1002 and the second UE 1004 may also release the unicast link again prior to expiration of the timer 1032 and/or the timer 1042, which in some aspects may again restart the duration of the paired state.

As illustrated at 1036, upon expiration of the timer 1032, the first UE 1002 may attempt to exit the paired state. As illustrated at 1046, upon expiration of the timer 1042, the second UE 1004 may attempt to exit the paired state 1046. In some aspects (e.g., where the unicast link was not reestablished since the timers were restarted or where a subsequent link release did not restart the timers), the first UE 1002 and the second UE 1004 may enter the unpaired state and may release the security context associated with the unicast link. In some aspects (e.g., where the unicast link has been reestablished since the timers were started or restarted but has not been re-released and refreshed), the first UE 1002 and the second UE 1004 may wait until an ongoing data transfer 1022 has completed. Upon completion of the data transfer 1022, the first UE 1002 and the second UE 1004 may release the unicast link as illustrated at 1024, and may enter the unpaired state and release the security context associated with the unicast link. In some aspects (e.g., where the unicast link has been reestablished since the timers were started or restarted but has not been re-released and refreshed), the first UE 1002 and the second UE 1004 may pause the data transfer 1022, may reestablish a security context for the unicast link, and may resume the data transfer 1022 upon reestablishing the security context.

Figure 11:
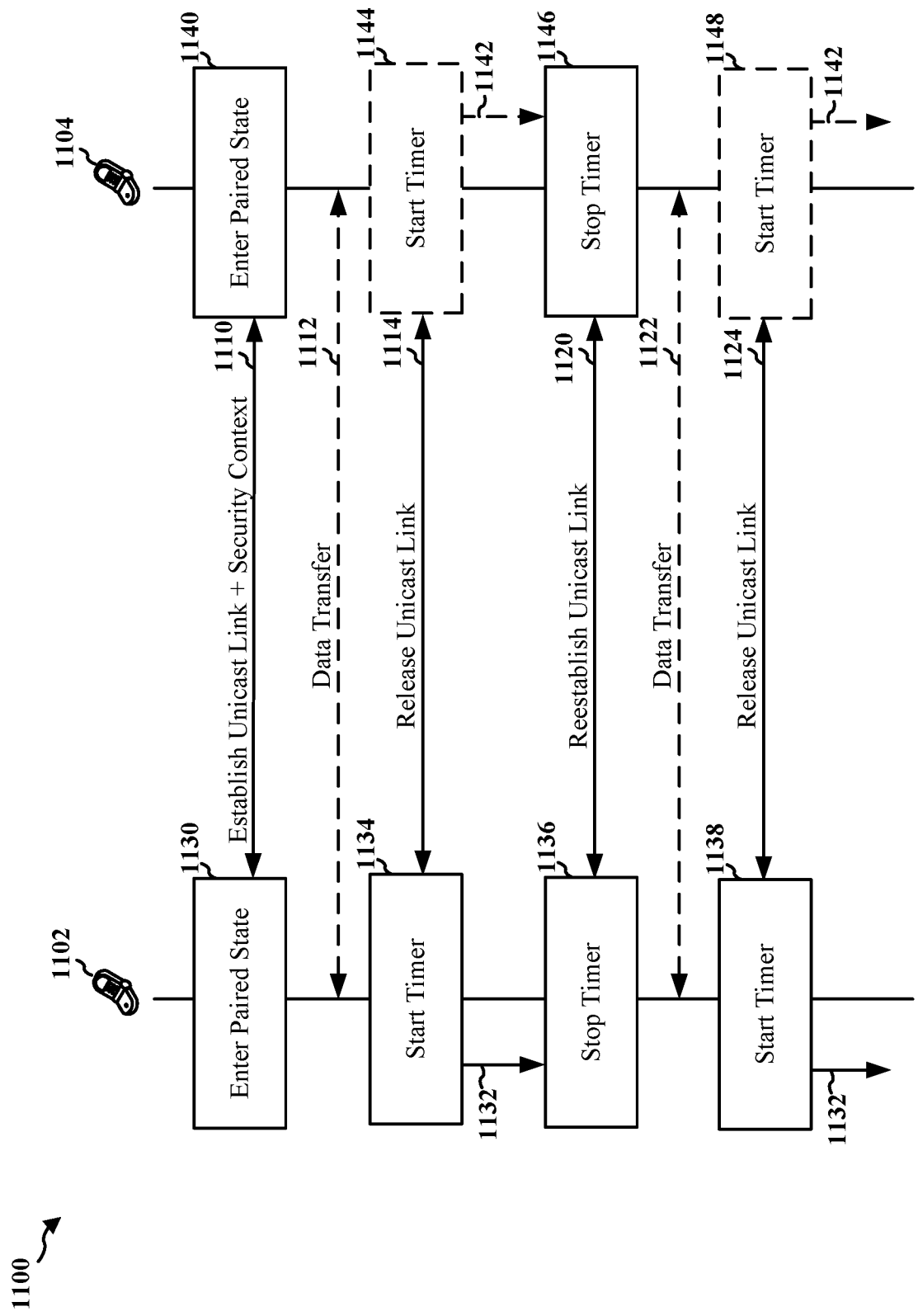
FIG. 11 is a communication diagram illustrating a first UE and a second UE utilizing a sidelink paired state with a timer stopped based on reestablishment of the unicast link.

FIG. 11 is a communication diagram 1100 illustrating a first UE 1102 and a second UE 1104 utilizing a sidelink paired state with a timer stopped based on reestablishment of the unicast link.

The first UE 1102 and the second UE 1104 may establish a unicast link and security context as illustrated at 1110. The first UE 1102 and the second UE 1104 may enter the paired state as illustrated at 1130 and 1140, respectively, without starting timers associated with the paired state. The first UE 1102 and the second UE 1104 may then perform a data transfer 1112 on the unicast link pursuant to the established security context.

As illustrated at 1114, the first UE 1102 and the second UE 1104 may release the unicast link 1114. Upon releasing the unicast link, as illustrated at 1134, the first UE 1102 may start a timer 1132 associated with the unicast link. While the timer 1132 has not expired, the first UE 1102 remains in the paired state and retains the security context associated with the unicast link. Similarly, upon releasing the unicast link, as illustrated at 1144, the second UE 1104 may start a timer 1142 associated with the unicast link. While the timer 1142 has not expired, the second UE 1104 remains in the paired state and retains the security context associated with the unicast link.

While in the paired state, the first UE 1102 and the second UE 1104 may reestablish the unicast link as illustrated at 1120 without reestablishing the security context (e.g., as described with respect to 420 and FIGS. 6, 7A, and 7B). Upon reestablishing the unicast link, as illustrated at 1136, the first UE 1102 may stop the timer 1132. Similarly, upon releasing the unicast link, as illustrated at 1146, the second UE 1104 may stop the timer 1142. While the reestablished unicast link remains active between the first UE 1102 and the second UE 1104, first UE 1102 and the second UE 1104 remain in the sidelink paired state and retain the security context for the unicast link, even though their respective timers have been stopped.

While the reestablished unicast link is active, the first UE 1102 and the second UE 1104, may perform a data transfer 1122 on the reestablished unicast link (e.g., as described with respect to 422), and may release the reestablished unicast link as illustrated at 1124 (e.g., as described with respect to 424). Upon releasing the unicast link, as illustrated at 1138, the first UE 1102 may start the timer 1132 (e.g., restart the timer 1132 at the initial value or resume the timer 1132 from the value when the timer 1132 was stopped). Upon releasing the unicast link, as illustrated at 1148, the second UE 1104 may start the timer 1142 (e.g., restart the timer 1142 at the initial value or resume the timer 1132 from the value when the timer 1132 was stopped). The first UE 1102 and the second UE 1104 may remain in the paired state and retain the security context for the unicast link while their respective timers have not expired.

Figure 12:
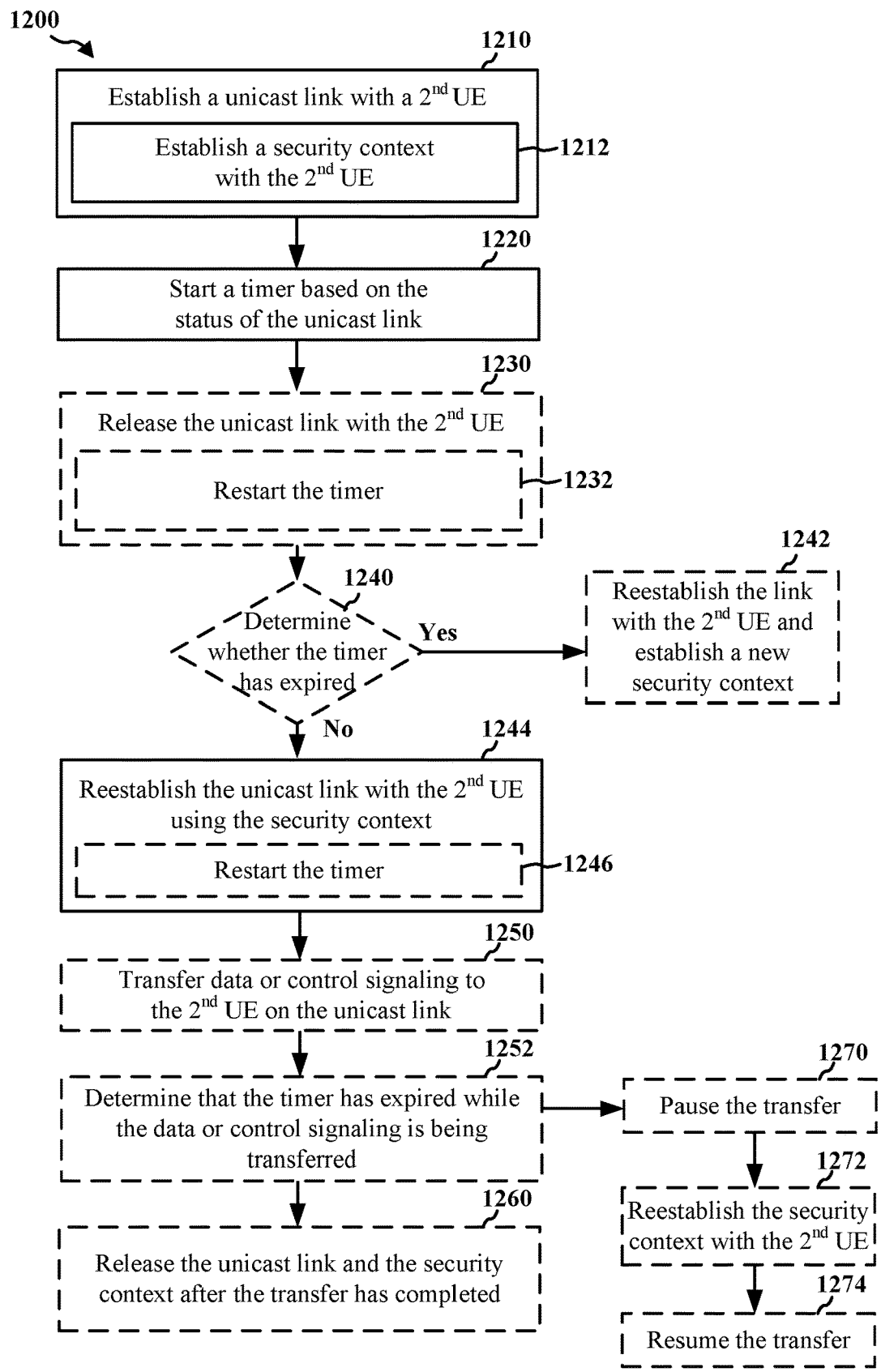
FIG. 12 is a flowchart of a method of wireless communication.

FIG. 12 is a flowchart 1200 of a method of wireless communication. The method may be performed by a UE or a component of a UE. For example, the method may be performed by any of UEs 104, 402, 404, 502, 504, 602, 604, 702, 704, 722, 724, 802, 804, 902, 904, 1002, 1004, 1102, 1104; the device 310 or 350; a processing system, which may include memory 360, 376 and components configured to perform each of the blocks of the method, and which may be an entire UE or a component of a UE, such as the TX processor 316 or 368, the RX processor 356 or 370, and/or the controller/processor 359 or 375. According to various aspects, one or more of the illustrated operations of method 1200 may be omitted, transposed, and/or contemporaneously performed. Optional aspects are illustrated with a dashed line.

At 1210, the first UE establishes a unicast link with a second UE. Establishing the unicast link includes an authentication and security establishment procedure between the first UE and the second UE. The security context may include a PC5-S security context.

In some aspects, upon establishing the security context with the second UE, the first UE may transition from a sidelink unpaired state to a sidelink paired state with the second UE. The first UE may not retain the security context for the second UE when the first UE is in the sidelink unpaired state, and may retain the security context for the second UE in the sidelink paired state. The first UE may not perform the authentication and security establishment procedure upon reestablishing the unicast link with the second UE after performing a unicast link release of the unicast link if the first UE is in the sidelink paired state. Reestablishing the unicast link while the first UE is in the sidelink paired state may include transmitting a security token to the second UE for the second UE to verify the first UE. The security context may include one or more key and one or more security procedure. The first UE may create the security token based on the one or more key, the security procedure, an identifier of the first UE, and an identifier of the unicast link, or any combination thereof. In some aspects, the first UE may receive a reject message from the second UE based on the second UE being unable to verify the first UE based on the security token, may stop the timer, and may release the security context.

In some aspects, establishing the unicast link may include negotiating a timer duration with the second UE. A duration of the timer may be based on the timer duration. A timer duration may refer to a value to be used for the timer, and a duration of the timer may refer to the value set for the timer.

At 1212, the first UE establishes a security context with the second UE during the authentication and security establishment procedure. Establishing the security context with the second UE may include establishing and exchanging security keys with the second UE for secure communication over the unicast link. The secure communication may include PC5-S control signaling and data transfer over sidelink dedicated radio bearers (DRBs) established on the unicast link At 1220, the first UE starts a timer based on a status of the unicast link. In some aspects, the timer may be started when the unicast link is initially established. In some aspects, the timer may be started when the unicast link is released or a radio link failure occurs.

In some aspects, at 1230, the first UE may release the unicast link with the second UE before an expiration of the timer. The unicast link with the second UE may be released upon completion of data transfer over the unicast link or detection of radio link failure. In some aspects, at 1232, the first UE may restart the timer upon releasing the unicast link.

At 1240, the first UE may determine whether the timer has expired. For example, the UE may be requesting direct communication from the second UE or may have received a request for direct communication from the second UE, and may be determining whether the timer has expired as a result of the new request for direct communication. In some aspects, at 1242, the first UE may establish a new security context to reestablish the unicast link with the second UE if the unicast link is reestablished after the timer expires. Reestablishing the security context with the second UE may include performing the PC5-S security establishment procedure.

At 1244, the first UE reestablishes the unicast link with the second UE using the security context when the unicast link is reestablished prior to expiration of the timer. In some aspects, at 1246, the first UE restarts the timer when the unicast link is reestablished before an expiration of the timer. In some aspects, the first UE may stop the timer upon reestablishing the unicast link before expiration of the timer.

In some aspects, at 1250, the first UE may transfer data or control signaling to the second UE on the unicast link. At 1252, the first UE may determine that the timer has expired while the data or control signaling is being transferred. In some aspects, at 1260, the first UE may release the unicast link and the security context after the transferring the data or control signaling has completed. In some aspects, at 1270 the first UE may pause the transferring the data or control signaling. At 1272, the first UE may reestablish the security context with the second UE. At 1274, the first UE may resume the transferring the data or control signaling after the security context is reestablished.

In some aspects, the first UE may receive a RRC message from a base station. The RRC message may include a timer duration. The first UE may set a duration of the timer based on the timer duration, and may configure a timer of the second UE utilizing a configuration message sent over the unicast link based on the timer duration.

In some aspects, the first UE may receive a timer duration from the second UE. The second UE may have received the timer duration from a base station. The first UE may set the duration of the timer based on the timer duration.

In some aspects, the first UE may determine that the first UE is out of a coverage area of a base station, may determine that the second UE is out of the coverage area of the base station, and may set a duration of the timer based on a preconfigured timer duration.

In some aspects, establishing the unicast link may include transmitting an indicator to the second UE. The first UE may retain the security context based on the indicator and may use the retained security context when reestablishing the unicast link. In some aspects, the first UE may receive a second indicator from the second UE in response to transmitting the indicator, the second indicator indicating to the first UE that the second UE can retain the security context. In some aspects, the first UE may receive a release indicator from the second UE, the release indicator indicating that the second UE is no longer retaining the security context.

An apparatus may be provided that includes components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
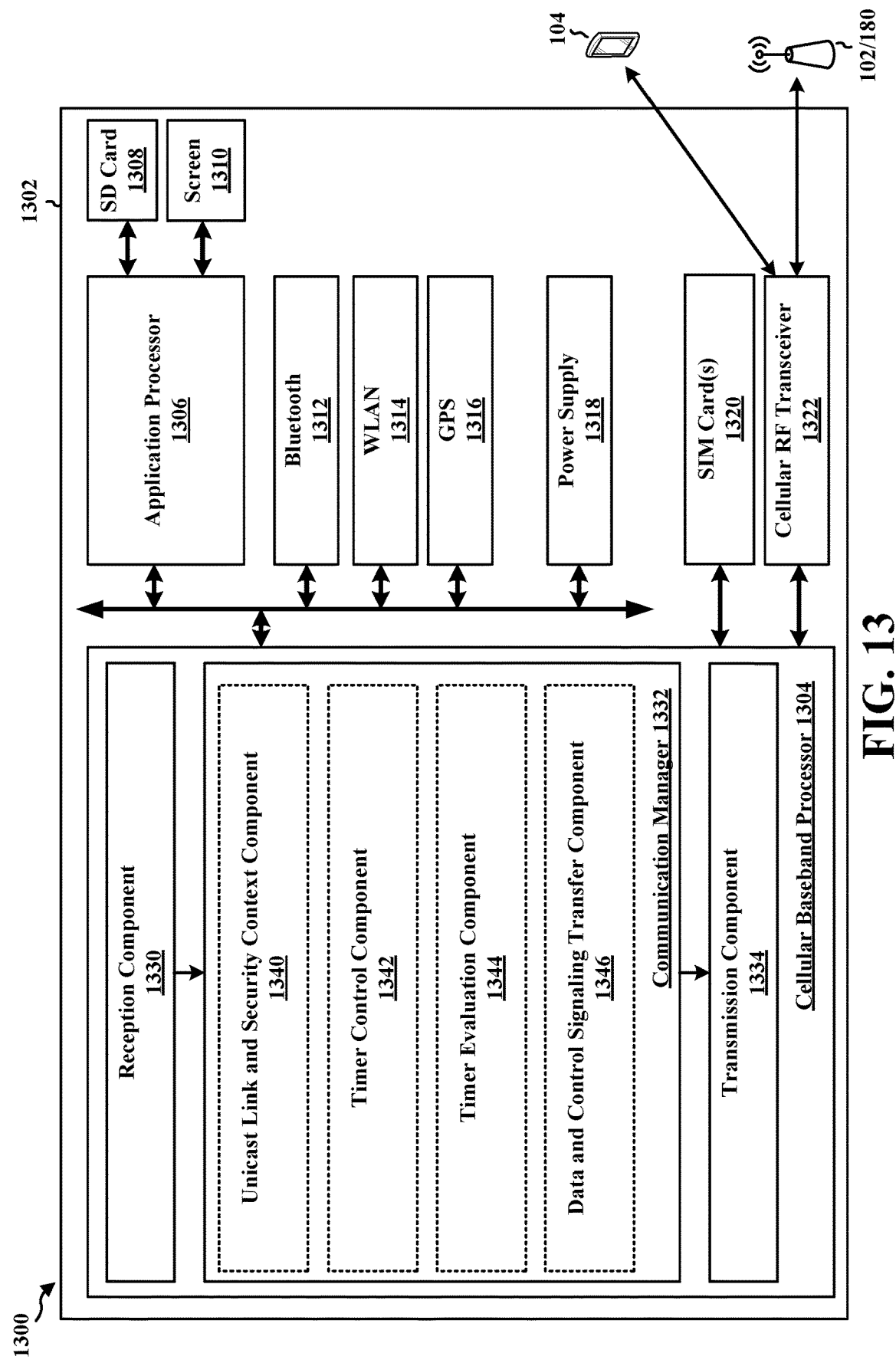
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a unicast link and security component 1340 that is configured to establish a unicast link with a second UE, e.g., as described in connection with 1210 of FIG. 12, to release the unicast link with the second UE, e.g., as described in connection with 1230 of FIG. 12, to reestablish the link with the second UE and establish a new security context, e.g., as described in connection with 1242 of FIG. 12, to reestablish the unicast link with the second UE using the previously established security context, e.g., as described in connection with 1244 of FIG. 12, to release the unicast link and the security context after a transfer has completed, e.g., as described in connection with 1260 of FIG. 12, and to reestablish the security context with the second UE after a transfer is paused, e.g., as described in connection with 1272 of FIG. 12. The communication manager 1332 further includes a timer control component 1342 that is configured to start a timer based on the status of a unicast link, e.g., as described in connection with 1220 of FIG. 12, and to restart the timer, e.g., as described in connection with 1232 and 1246 of FIG. 12. The communication manager 1332 further includes a timer evaluation component 1344 that is configured to determine whether the timer has expired, e.g., as described in connection with 1240 of FIG. 12, and to determine that the timer has expired while data or control signaling is being transferred, e.g., as described in connection with 1252 of FIG. 12. The communication manager 1332 further includes a data and control signaling transfer component 1346 that is configured to transfer data or control signaling to a second UE on a unicast link, e.g., as described in connection with 1250 of FIG. 12, to pause the transfer of data or control signaling, e.g., as described in connection with 1270 of FIG. 12, and to resume the transfer of data or control signaling, e.g., as described in connection with 1274 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for establishing a unicast link with a second UE, means for establishing the unicast link comprising an authentication and security establishment procedure between the first UE and the second UE, establishing a security context with the second UE during the authentication and security establishment procedure, means for starting a timer based on a status of the unicast link, and means for reestablishing the unicast link with the second UE using the security context when the unicast link is reestablished prior to expiration of the timer. In some aspects, the apparatus 1302 and in particular the cellular baseband processor 1304, includes means for receiving a reject message from the second UE based on the second UE being unable to verify the first UE based on a security token, means for stopping a timer, and means for releasing a security context.

In some aspects, the apparatus 1302 and in particular the cellular baseband processor 1304, includes means for receiving a radio resource control (RRC) message from a base station, the RRC message comprising a timer duration, means for setting a duration of the timer based on the timer duration, and means for configuring a timer of the second UE utilizing a configuration message sent over the unicast link based on the timer duration.

In some aspects, the apparatus 1302 and in particular the cellular baseband processor 1304, includes means for receiving a timer duration from the second UE, wherein the second UE received the timer duration from a base station and means for setting the a duration of the timer based on the timer duration.

In some aspects, the apparatus 1302 and in particular the cellular baseband processor 1304, includes means for determining that the first UE is out of a coverage area of a base station, means for determining that the second UE is out of the coverage area of the base station, and means for setting a duration of the timer based on a preconfigured timer duration.

In some aspects, the apparatus 1302 and in particular the cellular baseband processor 1304, includes means for restarting the timer when the unicast link is reestablished before an expiration of the timer.

In some aspects, the apparatus 1302 and in particular the cellular baseband processor 1304, includes means for releasing the unicast link with the second UE before an expiration of the timer and means for restarting the timer upon releasing the unicast link.

In some aspects, the apparatus 1302 and in particular the cellular baseband processor 1304, includes means for transferring data or control signaling to the second UE on the unicast link, means for determining that the timer has expired while the data or control signaling is being transferred, and means for releasing the unicast link and the security context after the transferring the data or control signaling has completed.

In some aspects, the apparatus 1302 and in particular the cellular baseband processor 1304, includes means for transferring data or control signaling to the second UE on the unicast link, means for determining that the timer has expired while the data or control signaling is being transferred, means for pausing the transferring the data or control signaling, means for reestablishing the security context with the second UE, and means for resuming the transferring the data or control signaling after the security context is reestablished.

In some aspects, the apparatus 1302 and in particular the cellular baseband processor 1304, includes means for receiving a second indicator from the second UE in response to transmitting the indicator, the second indicator indicating to the first UE that the second UE can retain the security context.

In some aspects, the apparatus 1302 and in particular the cellular baseband processor 1304, includes means for receiving a release indicator from the second UE, the release indicator indicating that the second UE is no longer retaining the security context.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples illustrate example embodiments. These embodiments and aspects of these embodiments may be used in combination with any previous embodiments or aspects of the previous embodiments disclosed or discussed in relation to the systems, methods, or devices of the figures.

Example 1 is a method of wireless communication at a first UE, comprising: establishing a unicast link with a second UE, establishing the unicast link comprising an authentication and security establishment procedure between the first UE and the second UE; establishing a security context with the second UE during the authentication and security establishment procedure; starting a timer based on a status of the unicast link; and reestablishing the unicast link with the second UE using the security context when the unicast link is reestablished prior to expiration of the timer.

In Example 2, the method of Example 1 includes that upon establishing the security context with the second UE, the first UE transitions from a sidelink unpaired state to a sidelink paired state with the second UE, wherein the first UE does not retain the security context for the second UE when the first UE is in the sidelink unpaired state, and wherein the first UE does retain the security context for the second UE in the sidelink paired state.

In Example 3, the method of any of Examples 1 and 2 further includes that the first UE does not perform the authentication and security establishment procedure upon reestablishing the unicast link with the second UE after performing a unicast link release of the unicast link if the first UE is in the sidelink paired state.

In Example 4, the method of any of Examples 1-3 further includes that reestablishing the unicast link while the first UE is in the sidelink paired state comprises transmitting a security token to the second UE for the second UE to verify the first UE.

In Example 5, the method of any of Examples 1-4 further includes that the security context comprises one or more key and one or more security procedure, the method further comprising creating the security token based on the one or more key, the security procedure, an identifier of the first UE, and an identifier of the unicast link.

In Example 6, the method of any of Examples 1-5 further includes receiving a reject message from the second UE based on the second UE being unable to verify the first UE based on the security token; stopping the timer; and releasing the security context.

In Example 7, the method of any of Examples 1-6 further includes that the security context includes a PC5-S security context.

In Example 8, the method of any of Examples 1-7 further includes receiving a RRC message from a base station, the RRC message comprising a timer duration; setting a duration of the timer based on the timer duration; and configuring a timer of the second UE utilizing a configuration message sent over the unicast link based on the timer duration.

In Example 9, the method of any of Examples 1-8 further includes receiving a timer duration from the second UE, wherein the second UE received the timer duration from a base station; and setting the duration of the timer based on the timer duration.

In Example 10, the method of any of Examples 1-9 further includes that establishing the unicast link further comprises negotiating a timer duration with the second UE, and wherein a duration of the timer is based on the timer duration.

In Example 11, the method of any of Examples 1-10 further includes determining that the first UE is out of a coverage area of a base station; determining that the second UE is out of the coverage area of the base station; and setting a duration of the timer based on a preconfigured timer duration.

In Example 12, the method of any of Examples 1-11 further includes that the first UE establishes a new security context to reestablish the unicast link with the second UE if the unicast link is reestablished after the timer expires.

In Example 13, the method of any of Examples 1-12 further includes that the timer is started when the unicast link is initially established.

In Example 14, the method of any of Examples 1-13 further includes restarting the timer when the unicast link is reestablished before an expiration of the timer.

In Example 15, the method of any of Examples 1-14 further includes releasing the unicast link with the second UE before an expiration of the timer; and restarting the timer upon releasing the unicast link.

In Example 16, the method of any of Examples 1-15 further includes that the unicast link with the second UE is released upon completion of data transfer over the unicast link or detection of radio link failure.

In Example 17, the method of any of Examples 1-16 further includes that the timer is started when the unicast link is released or a radio link failure occurs.

In Example 18, the method of any of Examples 1-17 further includes stopping the timer upon reestablishing the unicast link before expiration of the timer.

In Example 19, the method of any of Examples 1-18 further includes transferring data or control signaling to the second UE on the unicast link; determining that the timer has expired while the data or control signaling is being transferred; and releasing the unicast link and the security context after the transferring the data or control signaling has completed.

In Example 20, the method of any of Examples 1-19 further includes transferring data or control signaling to the second UE on the unicast link; determining that the timer has expired while the data or control signaling is being transferred; pausing the transferring the data or control signaling; reestablishing the security context with the second UE; and resuming the transferring the data or control signaling after the security context is reestablished.

In Example 21, the method of any of Examples 1-20 further includes that reestablishing the security context with the second UE includes performing a PC5-S security establishment procedure.

In Example 22, the method of any of Examples 1-21 further includes that establishing the security context with the second UE comprises establishing and exchanging security keys with the second UE for secure communication over the unicast link.

In Example 23, the method of any of Examples 1-22 further includes that the secure communication includes PC5-S control signaling and data transfer over sidelink dedicated radio bearers (DRBs) established on the unicast link.

In Example 24, the method of any of Examples 1-23 further includes that establishing the unicast link further comprises transmitting an indicator to the second UE, wherein the first UE retains the security context based on the indicator and uses the retained security context when reestablishing the unicast link.

In Example 25, the method of any of Examples 1-24 further includes receiving a second indicator from the second UE in response to transmitting the indicator, the second indicator indicating to the first UE that the second UE can retain the security context.

In Example 26, the method of any of Examples 1-26 further includes receiving a release indicator from the second UE, the release indicator indicating that the second UE is no longer retaining the security context.

Example 27 is an apparatus for wireless communication, comprising: a memory; and at least one processor coupled to the memory and configured to perform the method of any of Examples 1-26.

Example 28 is an apparatus for wireless communication including means for implementing a method or realizing an apparatus as in any of Examples 1-26.

Example 29 is a computer readable medium storing computer executable code, the code when executed by a processor cause the processor to perform the method of any of Examples 1-26.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
    establishing a unicast link with a second UE, establishing the unicast link comprising a security establishment procedure between the first UE and the second UE;
    establishing a security context with the second UE during the security establishment procedure;
    starting a timer based on a status of the unicast link;
    reestablishing the unicast link with the second UE using the security context when the unicast link is reestablished prior to expiration of the timer;
    stopping the timer upon re-establishing the unicast link prior to the expiration of the timer; and
    restarting the timer from a current value that the timer was stopped upon releasing the unicast link.

2. The method of claim 1, wherein upon establishing the security context with the second UE, the first UE transitions from a sidelink unpaired state to a sidelink paired state with the second UE, wherein the first UE does not retain the security context for the second UE when the first UE is in the sidelink unpaired state, and wherein the first UE does retain the security context for the second UE in the sidelink paired state.

3. The method of claim 2, wherein the first UE does not perform the security establishment procedure upon reestablishing the unicast link with the second UE after performing a unicast link release of the unicast link if the first UE is in the sidelink paired state.

4. The method of claim 3, wherein reestablishing the unicast link while the first UE is in the sidelink paired state comprises transmitting a security token to the second UE for the second UE to verify the first UE.

5. The method of claim 4, wherein the security context comprises one or more key and one or more security procedure, the method further comprising creating the security token based on the one or more key, the security procedure, an identifier of the first UE, and an identifier of the unicast link.

6. The method of claim 1, wherein the security context includes a PC5-S security context.

7. An apparatus for wireless communication at a first user equipment (UE), comprising:
    a memory; and
    at least one processor coupled to the memory and configured to:
        establish a unicast link with a second UE, establishing the unicast link comprising a security establishment procedure between the first UE and the second UE;
        establish a security context with the second UE during the security establishment procedure;
        start a timer based on a status of the unicast link;
        reestablish the unicast link with the second UE using the security context when the unicast link is reestablished prior to expiration of the timer;
        stop the timer upon re-establishing the unicast link prior to the expiration of the timer; and
        restarting the timer from a current value that the timer was stopped upon releasing the unicast link.

8. The apparatus of claim 7, wherein upon establishing the security context with the second UE, the first UE transitions from a sidelink unpaired state to a sidelink paired state with the second UE, wherein the first UE does not retain the security context for the second UE when the first UE is in the sidelink unpaired state, and wherein the first UE does retain the security context for the second UE in the sidelink paired state.

9. The apparatus of claim 8, wherein the at least one processor is not configured to perform the security establishment procedure upon reestablishing the unicast link with the second UE after performing a unicast link release of the unicast link if the first UE is in the sidelink paired state.

10. The apparatus of claim 7, wherein the security context includes a PC5-S security context.

* * * * *